(12) United States Patent
Shi et al.

(10) Patent No.: US 7,585,546 B2
(45) Date of Patent: Sep. 8, 2009

(54) SURFACE PASSIVATION AND SEALING OF MICRO-OPTICS DEVICES FOR IMPROVED PERFORMANCE IN HARSH ENVIRONMENTS

(75) Inventors: Ming Shi, Arcadia, CA (US); William Freeman, Castro Valley, CA (US); Johnny Zhong, Union City, CA (US); Liren Du, San Jose, CA (US); Xin Lou, Sunnyvale, CA (US); Steve Wang, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 922 days.

(21) Appl. No.: 10/916,683

(22) Filed: Aug. 11, 2004

(65) Prior Publication Data

US 2005/0037141 A1    Feb. 17, 2005

Related U.S. Application Data

(60) Provisional application No. 60/494,633, filed on Aug. 11, 2003.

(51) Int. Cl.
*C23C 16/00* (2006.01)

(52) U.S. Cl. ............ 427/248.1; 359/566; 359/569; 385/80; 385/31; 385/33; 385/38; 385/52; 250/370.11; 250/361; 250/366; 250/368; 250/372; 257/350; 257/59; 257/70; 257/72; 257/627; 96/33; 96/36.2; 96/36.3; 96/88; 427/54; 427/145; 427/301; 427/322; 427/437; 427/115; 427/255.11; 427/255.18; 427/294; 264/272.17

(58) Field of Classification Search .......... 359/566, 359/569; 250/370.11; 257/350; 385/80; 96/33; 264/272.17; 427/248.1
See application file for complete search history.

(56) References Cited

U.S. PATENT DOCUMENTS

| | | | | |
|---|---|---|---|---|
| 3,964,906 | A  * | 6/1976 | Kenney | 430/275.1 |
| 6,019,522 | A  * | 2/2000 | Kim | 385/80 |
| 6,303,963 | B1 * | 10/2001 | Ohtani et al. | 257/350 |
| 6,414,316 | B1 * | 7/2002 | Maydanich et al. | 250/370.11 |
| 2002/0047120 | A1 * | 4/2002 | Inukai | 257/59 |
| 2002/0048086 | A1 * | 4/2002 | Bos | 359/566 |
| 2003/0193113 | A1 * | 10/2003 | Glovatsky | 264/272.17 |
| 2005/0036748 | A1 | 2/2005 | Freeman et al. | |

FOREIGN PATENT DOCUMENTS

JP    62239549 A  * 10/1987
JP    10112459 A  *  4/1998

* cited by examiner

*Primary Examiner*—Michael Barr
*Assistant Examiner*—Andrew Bowman
(74) *Attorney, Agent, or Firm*—Workman Nydegger

(57) ABSTRACT

Methods and structures for reducing and/or eliminating moisture penetration in an optical package. The optical package may include (1) a layer of inorganic material placed over the points of the optical package susceptible moisture penetration of the optical package; (2) a portion of hygroscopic material placed over the points of the optical package susceptible to moisture penetration; (3) a layer of hygroscopic material placed on the interior surface of the optical package; and/or (4) a layer of hydrophobic material coated on the optical surfaces of the optical package.

30 Claims, 1 Drawing Sheet

SURFACE PASSIVATION AND SEALING OF MICRO-OPTICS DEVICES FOR IMPROVED PERFORMANCE IN HARSH ENVIRONMENTS

CROSS-REFERENCE TO RELATED APPLICATIONS

This application claims benefit from and priority to U.S. Provisional Patent Application No. 60/494,633, filed Aug. 11, 2003, and entitled "Surface Passivation and Sealing of Micro-optics Devices for Improved Performance in Harsh Environments," which application is hereby incorporated by reference in its entirety.

BACKGROUND OF THE INVENTION

1. The Field of the Invention

This invention relates generally to optical packages containing optical devices, including, but not limited to, optical collimators, optical filters, optical circulators, optical isolators, and other optical devices. More particularly, the invention relates to sealing optical packages including optical devices.

2. The Relevant Technology

Optical networking and telecommunication is increasingly employed as a method by which information can be reliably transmitted via a communications network. Networks employing optical networking and telecommunication technology are known as optical communications networks, and are marked by high bandwidth and reliable, high-speed data transmission. During recent years, the discrete optical components or devices in such networks have become less expensive and are capable of being used with networks having increasing date transmission rates. In addition, optical networks are employed in a variety of conditions and environments, some of which tend to damage or interfere with the operation of the optical devices in the network.

Moisture penetration, for example, is one of the problems affecting optical device applications, particularly in an uncontrolled environment. Harmful moisture may penetrate through non-hermetically sealed devices by way of epoxy sealing areas. This harmful moisture can affect the performance of optical devices in many ways.

One way moisture can adversely affect the performance of optical devices is by increasing optical loss due to absorption of the optical light by moisture, in the form of water vapor, in the optical path. For optical devices working in wavelengths where moisture molecules have strong absorptions, the problem of increased optical loss is magnified.

In addition, moisture adversely affects optical device performance by increasing insertion loss by reducing the optical coupling. Increased insertion loss occurs in various ways. For example, moisture, in the form of liquid water, may condense on an optical surface of the optical device. This is likely to happen at low temperatures, for example during temperature cycling (−20° C. to 85° C.) rather than in the field. The presence of the moisture on the optical surface will deflect or scatter the initial light trajectory, and as a result, light cannot be effectively coupled into the receiving port. In addition, increased insertion loss occurs when an optical surface, such as a filter, is attached to another optical component, such as a collimator, by epoxy. In this case the moisture molecules can penetrate the epoxy seal, thereby creating volume expansion and eventually leading to optical misalignment.

In the manufacture of optical devices, components are most often sealed with epoxy. As discussed above, however, water molecules can enter the optical device through the epoxy seal, resulting in several problems, such as those illustrated above. The epoxy sealing can only slow, and not prevent, the moisture penetration.

Previous efforts to reduce penetration of moisture into the optical package have been to soldering or metallizing bonding interfaces. However, this process can be expensive because the bonding parts must be metallized and then soldered together. In some cases, the metallization coating, usually Au or Ni, may delaminate from the metal container surface and completely destroy the sealing.

BRIEF SUMMARY OF THE INVENTION

The present invention provides methods and structures for forming a hermetic or near hermetic seal in an optical package containing an optical device. Exemplary optical devices include, but are not limited to isolators, collimators, filters, circulators, and the like. In one embodiment, the hermetic or near hermetic seal prevents moisture penetration and/or condensation in optical packages by reducing the moisture penetration rate into the optical package. Furthermore, moisture molecules penetrating into the optical device can be absorbed in non-critical areas of the optical package and hence do not adversely affect the optical coupling of the optical package.

The optical package may include (1) a layer of inorganic material placed over the points of the optical package susceptible to moisture penetration; (2) a portion of hygroscopic material placed over the points of the optical package susceptible to moisture penetration; (3) a layer of hygroscopic material placed on the interior surface of the optical package; and/or (4) a layer of hydrophobic material coated on the optical surfaces of the optical package.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The present invention relates systems and methods for hermetically sealing or near-hermetically sealing optical packages and/or optical devices. One function of the hermetic or near hermetic seal is to significantly reduce the moisture penetration rate into an optical package. Embodiments of the invention can also (1) increase the usable lifespan of optical devices to more than twice that of optical packages not incorporating the present technology, (2) increase the lifespan of the optical package indefinitely, and/or (3) improve the overall performance of the optical package. In addition, it will be appreciated that a hermetic or near-hermetic seal can eliminate penetration into the optical package of other harmful substances which may adversely effect the operation and/or life span of the optical package.

As used herein, the term "optical package" refers to an assembly having a housing which contains an optical device. An "optical device" can include, but is not limited to, isolators, collimators, filters, circulators, and the like. The optical device includes one or more optical elements which manipulate light to achieve a desired effect such as, but not limited to, polarization, diffraction, splitting, combining, filtering, and the like. It will be appreciated that the optical package may also include electronic components, commonly referred to as an optoelectronic package.

Figure 1:
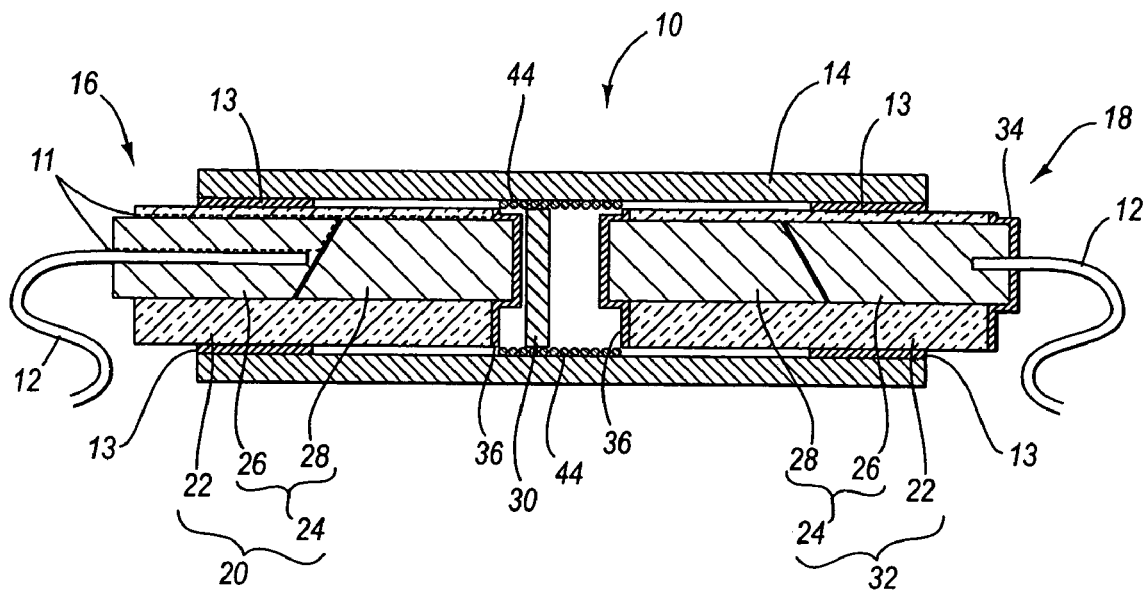
FIG. 1 illustrates an exemplary optical package having inorganic layers of material placed over the sealing interfaces and a portion of hygroscopic material placed over the end of the package.

Turning to FIG. 1, an exemplary optical package 10 is illustrated. Optical package 10 is configured to connect to segmented ends of an optical fiber 12. The optical package 10 includes housing 14 having a first end 16 and a second end 18. The first end 16 of the housing 14 contains an entrance port assembly 20. The entrance port assembly 20 includes a housing 22 containing a collimator 24. The collimator 24 includes a port portion 26 and optical transmission portion 28. Light passing through the optical transmission portion 28 passes through a filter 30 disposed in the housing 14 of the optical package 10. The light from the filter 30 then enters an exit port assembly 32. In one embodiment, the components of the exit port assembly 32 are the same as those of the entrance port assembly 20. It will be appreciated that the components of optical package 10 will differ depending on the type of optical device contained in the optical package.

FIG. 1 illustrates that points 11 of the optical package 10 susceptible to moisture penetration are formed by various component interfaces in the optical package 10. For example, the collimator 24 of the entrance port assembly 20 is generally joined to the housing 22 by epoxy. In addition, the interface between the segment of optical fiber 12 disposed in the port portion 26 of the entrance port assembly 20 forms another point 11 susceptible to moisture penetration. As shown in FIG. 1, the points 11 susceptible to moisture penetration can begin on an exterior of the optical package 10 and extend into the interior of the optical package 10. It will be appreciated that other points 11 susceptible to moisture penetration into the housing 14 of the optical package 10 can occur and the foregoing examples are provided by way of illustration and not by way of limitation. The bonding between the housing 22 of entrance port assembly 20 and exit port assembly 32 with the housing 14 of package 10 is usually formed from a solder or other metallized bond 13. Thus, this bond 13 is generally resistant to moisture penetration. However, in some cases, this may also provide another point 11 of potential moisture penetration.

In the embodiment of FIG. 1, moisture penetration is reduced and/or prevented by covering the points 11 susceptible to moisture penetration with a layer 34 of inorganic material. The moisture penetration rate of a material is related to its affinity toward moisture molecules. Generally, inorganic materials, such as metal oxides, are more resistive to moisture penetration than organic materials. One explanation for this is that organic materials are composed of large molecules compared to the smaller molecules of inorganic materials. The smaller molecular configurations of inorganic materials are more tightly packed or densely arranged than those of organic materials. This increased density of inorganic molecules makes it more difficult for water to penetrate the material. In contrast, organic materials have a high affinity to water molecules. In some cases, an inorganic material can have a moisture penetration rate of 100 times less than an organic material.

Thus, as shown in FIG. 1, a layer 34 of inorganic material is disposed over the exterior of the exit port assembly 32. The layer 34 can cover just the surfaces of exit port assembly 32 (FIG. 1). However, it will be appreciated that the layer 34 can extend to cover the entire end 18 of the housing 14 to ensure the moisture resistance of package 10 (FIG. 2).

By coating the points 11 susceptible to moisture penetration with one or more layers of inorganic material, the moisture penetration rate of the epoxy bond can be greatly reduced. For example, coating the points 11 susceptible to moisture penetration with a layer of inorganic material as thin as 100 angstroms can reduce the moisture penetration rate by more than 99%. Applying the inorganic layer to the points 11 susceptible to moisture penetration is easily done by vacuum deposition techniques, such as magnetron sputtering, chemical vapor deposition (CVD), physical vapor deposition (PVD) (also called sputtering), chemical liquid deposition (CLD) and the like. Application of the layer can substantially extend the lifetime of the optical package. It will be appreciated that a layer 34 of inorganic material can be placed on both ends of optical package 10 and that layer 34 shown on the exit port assembly 32 is shown by way of illustration only.

In another embodiment, shown in FIG. 1, a layer 36 of inorganic material is coated on both inside surfaces of the entrance port assembly 20 and exit port assembly 32 to cover the points 11 susceptible to moisture penetration that extend into the interior of the optical package 10. It will be appreciated that a layer 36 of inorganic material can be placed on only one of port assemblies 20, 32.

Figure 2:
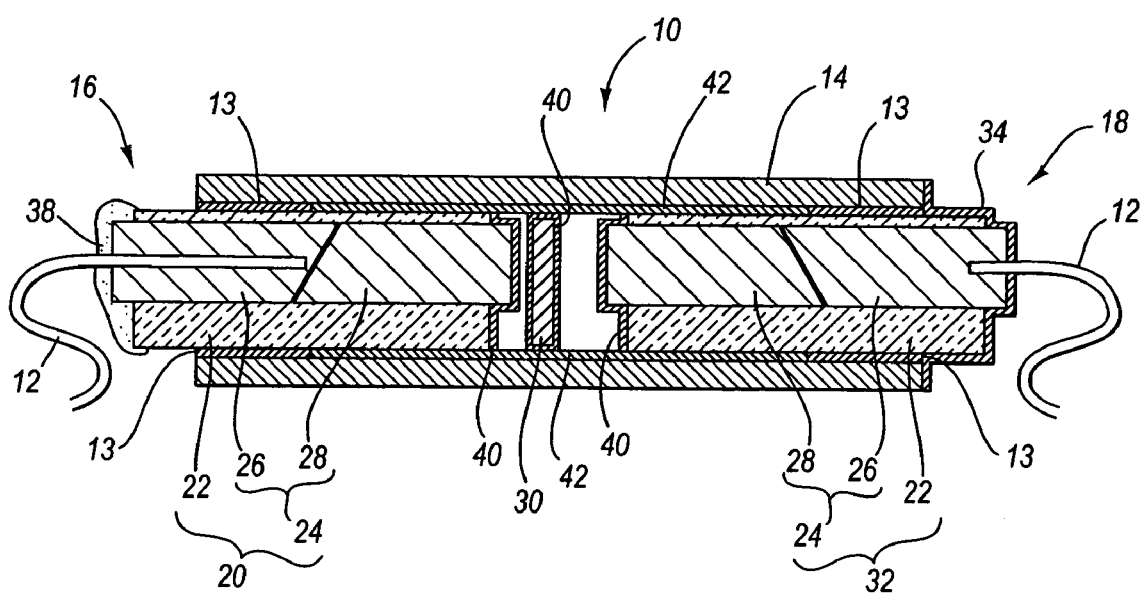
FIG. 2 illustrates another exemplary optical package having a hydrophobic layer on the optical surface of the package and also a hygroscopic layer placed on the interior of the package.

FIG. 2 shows another embodiment of reducing or preventing moisture penetration into optical package 10 in which a portion 38 of a hygroscopic material is placed over the points 11 susceptible to moisture penetration on the end of the optical package 10. Examples of hygroscopic materials which are materials having high moisture absorption rates include, but are not limited to, EVOH (ethylene vinyl alcohol), polytetraethylene vinyl alcohol, and silica gel. EVOH is a polymer that can be dissolved in water and spin coated to the inner surface of the optical package. Polytetraethylene vinyl alcohol is easily obtained by the ultra-violet curing of tetraethylene vinyl alcohol molecules.

The silica gel could be oxidized silica (e.g., $SiO_2$). In another embodiment, the silica could be a partially hydrolyzed siloxane ($R_2SiO_2$, where R is an alkyl group) which is extremely hygroscopic and will greatly lower the humidity or dew point in an enclosed environment. Siloxanes can have up to four functional groups (two on linear chains), a characteristic that allows for the hydrogen atoms of water molecules to easily bind and also to easily break the hydrogen bond through chemical removal techniques. Hydrogen bonding is thermally sensitive in raising the temperature of the moisture absorptive material with a rise in the vapor pressure of water, while chemically reactive removal is non-thermally sensitive. In one embodiment, shown in FIG. 1, the silica gel, in the form of particles 44 of uniform or variable size, can be packed inside the interior of the package 10 so as not to interfere with the transmission of light.

It will be appreciated that while portion 38 is shown only on the first end 16 of optical package 10, another portion 38 may also be placed over the second end 18 of the optical package. Use of a portion 38 of moisture absorbing material placed over the entrance and/or exit of the optical package 10 can preferentially absorb moisture molecules and reduce and/or prevent condensation on the optical surfaces of the package 10. In some cases, for the materials to be effective, the vapor pressure of water must be maintained below that of the dew point at the lowest temperature that the package 10 will experience. Use of the portion 38 in combination with moisture preventive layers 34 and/or 36 may enhance the elimination of adverse moisture-related effects in optical package 10.

FIG. 2 also illustrates another embodiment in which the optical surfaces of the optical package 10 are coated with a layer 40 of hydrophobic material, thus repelling the condensation of molecules thereon. Suitable hydrophobic materials can be constructed of, for example, polymeric material. In the embodiment of FIG. 2, the optical surfaces include optical transmission portions 28 of entrance port assembly 20 and exit port assembly 32 and the surfaces of filter 30. Hydrophobic layers 40 can be applied by suitable methods including, but not limited to, dipping, brushing, chemically depositing, spraying, and the like. It will be appreciated that hydrophobic layers 40 may be used in combination with other inorganic layers 34, 36 and/or hygroscopic portions 38.

Finally, as illustrated in FIG. 2, a layer 42 of hygroscopic material may be applied to the interior of the housing 14 of the optical package 10 to aid in moisture abatement. The hygroscopic material, located inside the optical package, physically or chemically binds water, thus preventing water from contaminating moisture sensitive components of the optical package 10. In this manner, the moisture is directed to non-critical moisture absorbing areas. In one embodiment, the interior surface of the package 10 can be roughened to increase the surface area to which the hygroscopic material may be applied. It will be appreciated that hygroscopic layer 42 can be used in combination with other inorganic layers 34, 36, hygroscopic portions 38, and/or hydrophobic layers 40.

The methods of the invention can greatly reduce or eliminate moisture in optical packages 10. While the Belcore standards specify that optical packages are to operate reliably for 500 hours in an environment of 85° C. and 85% relative humidity, the present invention can be used to manufacture optical packages that can withstand such conditions for 1,000 hours or more, which enables the optical packages to be used in a variety of conditions. The features of the invention also compensates for variability that may be inherent in manufacturing processes. For instance, if a particular batch of collimators or other optical package has a higher water ingress rate than other batches of similar devices, the hygroscopic interior of the optical package can absorb the extra moisture, enabling the device to perform reliably beyond the requirements of the Belcore standards. In general, the present invention can also be applicable to a novel multifunctional coating technology in photonics applications. The coating processes disclosed herein can be used to form photochromic, antireflective coatings. Such dual-purpose coatings promise to become increasingly important as more and different optical packages are introduced into the market.

The present invention can also be practiced in combination with the methods disclosed in U.S. Provisional Patent Application Ser. No. 60/494,634, filed Aug. 11, 2003, entitled "Surface Passivation and Sealing of Micro-Optics Devices for Improved Performance in Harsh Environments," and is incorporated herein by reference.

The present invention may be embodied in other specific forms without departing from its spirit or essential characteristics. The described embodiments are to be considered in all respects only as illustrative and not restrictive.

What is claimed is:

1. A method for sealing an optical package from moisture penetration, the method comprising:
   identifying a portion of an optical package susceptible to moisture penetration, the portion of the optical package comprising an interface between first and second optical components of the optical package that are in optical communication with each other; and
   applying a layer of inorganic material over the portion of the optical package such that a substantially hermetic seal is achieved at the interface, wherein the optical package comprises an optical device, wherein the optical device comprises one of the following: a collimator, isolator, filter, or circulator.

2. The method as recited in claim 1, further comprising:
   identifying an epoxy seal of the optical package susceptible to moisture penetration; and
   applying a layer of inorganic material over the epoxy seal.

3. The method as recited in claim 1, wherein the portion of the optical package is located on the exterior of the optical package.

4. The method as recited in claim 1, wherein the portion of the optical package extends into the interior of the optical package.

5. The method as recited in claim 1, wherein applying a layer of inorganic material comprises using a vapor deposition process.

6. The method as recited in claim 5, wherein vapor deposition process comprises at least one of chemical vapor deposition, physical vapor deposition, or chemical liquid deposition.

7. The method as recited in claim 1, wherein the optical package comprises an optical device having an optical surface.

8. The method as recited in claim 7, further comprising covering at least a portion of the at least one optical surface with a hydrophobic material.

9. The method as recited in claim 1, further comprising covering the portion of the optical package with a hygroscopic material.

10. The method as recited in claim 1, further comprising placing a hygroscopic material in an interior space of the optical package.

11. A method for sealing an optical package to reduce moisture penetration into the optical package, the method comprising:
    identifying a portion of an optical package susceptible to moisture penetration, the portion of the optical package comprising an interface between an optical fiber and another component with which the optical fiber is in optical communication; and
    covering the portion of the optical package with a hygroscopic material, wherein the optical package comprises an optical device, wherein the optical device comprises one of the following: a collimator, isolator, filter, or circulator.

12. The method of claim 11, further comprising:
    identifying an epoxy seal of the optical package susceptible to moisture penetration; and
    applying a layer of hygroscopic material over the epoxy seal.

13. The method as recited in claim 11, wherein the portion of the optical package is located on the exterior of the optical package.

14. The method as recited in claim 11, wherein the portion of the optical package extends into the interior of the optical package.

15. The method as recited in claim 11, wherein covering the portion of the optical package with a hygroscopic material comprises placing a portion of the hygroscopic material over an end of the optical package so that the portion of hygroscopic material covers the portion of the optical package.

16. The method as recited in claim 11, wherein covering the portion of the optical package with a hygroscopic material comprises applying a layer of hygroscopic material over an interior surface of the optical package so that the layer of hygroscopic material covers the portion of the optical package.

17. The method as recited in claim 11, wherein the hygroscopic material is selected from the group consisting of ethylene vinyl alcohol, polytetraethylene vinyl alcohol, and silica.

18. The method as recited in claim 11, further comprising applying a layer of inorganic material over the portion of the optical package.

19. The method as recited in claim 11, wherein the optical package comprises an optical device having an optical surface, wherein at least a portion of the optical surface is covered with a hydrophobic material.

20. The method as recited in claim 11, further comprising placing a hygroscopic material in an interior space of the optical package.

21. A method for reducing or preventing moisture penetration into an optical package, the method comprising:
 identifying an optical package having a housing containing an optical surface;
 identifying a portion of the optical package susceptible to moisture penetration, the portion of the optical package comprising an interface between an optical fiber and another component inside which the optical fiber is at least partially disposed;
 applying a layer of hygroscopic material over the portion of the optical package; and
 covering at least a portion of the optical surface with a hydrophobic material, wherein the optical package comprises an optical device, wherein the optical device comprises one of the following: a collimator, isolator, filter, or circulator.

22. The method as recited in claim 21, further comprising placing a hygroscopic material in the housing of the optical package.

23. The method as recited in claim 21, wherein the component inside which the optical fiber is at least partially disposed comprises a collimator.

24. The method as recited in claim 23, further comprising:
 identifying an epoxy seal of the optical package susceptible to moisture penetration; and
 applying a layer of hygroscopic material over the epoxy seal.

25. The method as recited in claim 23, wherein the portion of the optical package is located on the exterior of the optical package.

26. The method as recited in claim 21, wherein the collimator comprises a port portion inside which the optical fiber is at least partially disposed and an optical transmission portion through which light can pass between the optical fiber and a filter disposed within the optical package.

27. A method for sealing an optical package to reduce moisture penetration into an optical package, the method comprising:
 identifying an optical package having a portion susceptible to moisture penetration, the portion of the optical package comprising an interface between an optical fiber and another component inside which the optical fiber is at least partially disposed; and
 placing a hygroscopic material inside a space in the optical package to absorb moisture that enters through the portion of the optical package, wherein the optical package comprises an optical device, wherein the optical device comprises one of the following: a collimator, isolator, filter, or circulator.

28. The method as recited in claim 27, further comprising covering the portion of the optical package with a hygroscopic material.

29. The method as recited in claim 27, further comprising applying a layer of inorganic material over the portion of the optical package.

30. The method as recited in claim 27, wherein the optical package comprises an optical device having an optical surface, wherein at least a portion of the optical surface is covered with a hydrophobic material.

* * * * *

UNITED STATES PATENT AND TRADEMARK OFFICE
CERTIFICATE OF CORRECTION

PATENT NO. : 7,585,546 B2  Page 1 of 1
APPLICATION NO. : 10/916683
DATED : September 8, 2009
INVENTOR(S) : Shi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1336 days.

Signed and Sealed this

Fourteenth Day of September, 2010

David J. Kappos
*Director of the United States Patent and Trademark Office*